United States Patent Office 3,126,193
Patented Mar. 24, 1964

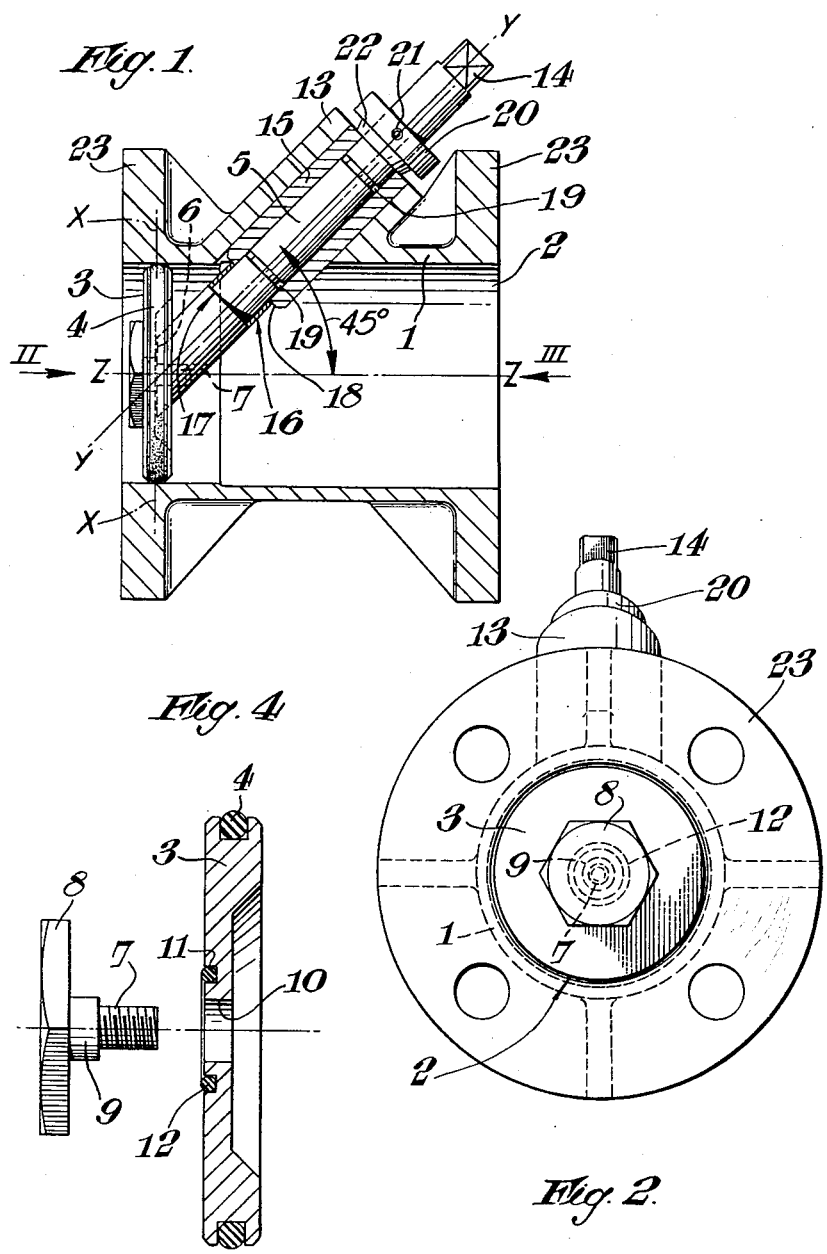

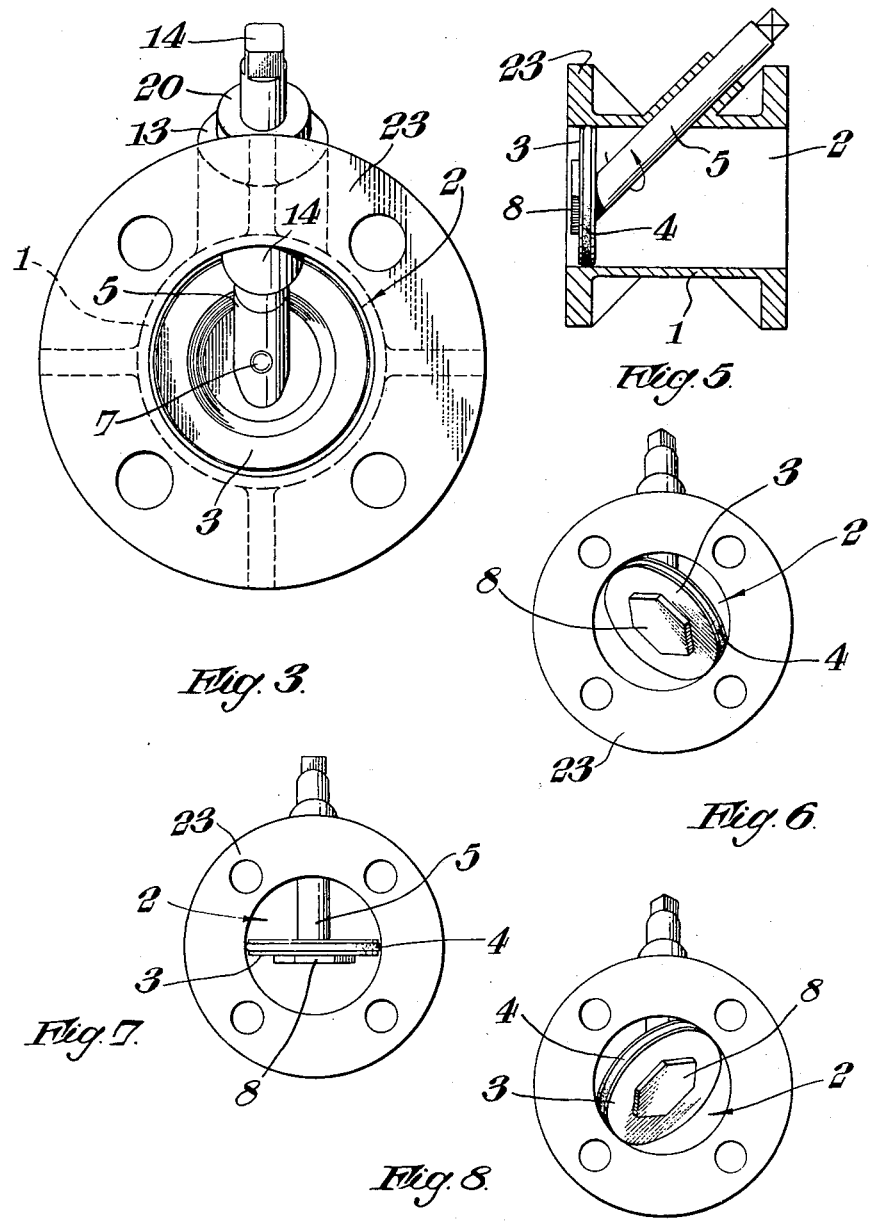

3,126,193
DISC VALVES
Lionel George Atherton, deceased, late of Ranmore, Dorking, Surrey, England, by Julia Cecilia Atherton, executrix, Ranmore, Dorking, Surrey, England
Filed Nov. 13, 1961, Ser. No. 152,099
1 Claim. (Cl. 251—88)

This invention relates to a valve device wherein the valve is a movable disc (or so-called "butterfly" valve) and has for its object to provide a construction which ensures efficient sealing and which has a self-cleaning action due to a combined sliding and rotary action of the valve periphery on the interior cylindrical surface of the passageway controlled by the valve.

The invention provides a valve device comprising a body having a cylindrical passageway for fluid, a valve disc within the passageway, said disc being coupled to an operating spindle mounted to rotate in the body with its axis set at an angle inclined to the disc face, whereby the periphery of the disc wipes along the wall of the passageway as the disc is rotated by the spindle, the inner end of the operating spindle being bevelled to correspond with the angle between the face of the disc and spindle axis, the disc abutting the bevel and being coupled to the spindle by a fixing screw passing into a tapping in the said bevelled end to secure the disc face against the bevel, said fixing screw providing a pivot about which the valve disc can rotate about its center axis.

In practical embodiments of the invention the operating has its axis passing through the center axis of the disc at an angle (herein termed the disc angle) which is preferably 45°, and the said spindle is mounted in a bearing tube opening into the valve body with the axis of the spindle inclined to the axis of the valve body at an angle complemental to the disc angle to make up 90°. Thus in a preferable construction both the disc angle and the spindle angle are 45° to ensure full opening of the valve.

By this arrangement, assuming the valve disc to be in its closed position in which it lies in a plane perpendicular to the axis of the fluid passageway, rotation of the operating spindle will give the valve disc a swash-plate movement to an open position during which the periphery of the disc will rotate and simultaneously slide over the cylindrical surface of the fluid way.

An embodiment of the said invention will be described by way of example, with reference to the accompanying drawings, in which:

FIGURE 1 is a longitudinal sectional elevation of the device;

FIGURE 2 is an end elevation from the direction of arrow II in FIGURE 1;

FIGURE 3 is an end elevation from the opposite end of the device in the direction of arrow III, FIGURE 1;

FIGURE 4 is a detail view to a larger scale of the valve disc with the fixing and pivot screw shown separated therefrom; and FIGURES 5, 6, 7 and 8 are diagrammatic views showing different positions of the valve disc as the operating spindle is turned from valve closed to the valve open position, FIGURE 5 being a sectional side elevation, in the valve closed position (0 and 360 degrees), and FIGURES 6, 7 and 8 end elevations respectively at 90, 180 and 270 degree turns of the operating spindle.

The valve device shown comprises a cylindrical tubular valve body 1 the fluid passageway 2 of which is controlled by a disc valve 3 which has its periphery faced with a suitable sealing material, such as a ring 4 of india-rubber or a soft plastics substance, the character of which is dependent upon the nature of the fluid—whether gas or a liquid—passing through the valve. In the example the valve disc periphery is grooved to receive the sealing ring which is compressible and of circular cross-section as will be seen in FIGURE 4.

The valve disc 3 is attached to the end of an operating spindle 5 the axis Y—Y of which is inclined at 45 degrees to the plane X—X of the disc as indicated in FIGURE 1 and passes through the disc center which is co-axial with the axis Z—Z of the passageway 2.

The inner end of the spindle 5 to which the valve disc 3 is attached is bevelled at 45 degrees and the face of the disc abuts this bevel 6, the coupling connection between bevel and disc taking any suitable form, such as the hexagonal headed screw 7.

The valve disc 3 is rotatable in relation to the operating spindle 5, and for this purpose the coupling screw 7 is constituted as a securing pivot which is passed through the center of the disc 3 into the bevelled face 6 of the spindle 5. Between the head 8 and the screw portion 7, there is a plain bearing ring 9 (FIGURE 4) on which, by means of a center hole bearing 10, the valve disc 3 is rotatable, the bearing ring 9 being slightly longer than the hole 10 so that when the screw 7 is tightened up in the bevelled face 6 of the spindle 5, clearance is provided for the required rotation of the valve disc.

The aforesaid peripheral seal 4 prevents fluid leakage between the edge of the valve disc 3 and the wall of the passageway 2 in the valve body. An additional guard against fluid leakage where the valve disc is coupled to the spindle, may be provided by furnishing the head of the pivot screw (7, 8, 9) with suitable sealing means which is compressed against the face of the disc. Thus, for example, the valve disc may have formed on the outer or head side, an annular recess 11 in which a rubber or other compressible sealing ring 12 is fitted, the ring projecting from the disc face slightly so as to be compressed when the screw head 8 is tightened up against it, see FIGURE 4.

The valve body 1 is formed with a housing bearing tube 13 opening into the fluid passageway 2 and lying at an angle of 45 degrees to the axis Z—Z of the passageway as indicated in FIGURE 1. This spindle angle is thus complemental to the disc angle formed between the plane X—X of the disc and the spindle axis Y—Y.

The valve operating spindle 5 extends from the back of the valve disc into said housing and at the outer end projects externally for operation by suitable means, which may be manually or power operated. Conveniently, the outer projecting end of the spindle 5 has a square end 14 for attachment of a drive handle or other member.

Any suitable means may be provided for sealing the spindle 5 against fluid loss through the housing 13. Thus, the bearing for the spindle in the housing may include a compression spring or other packing (not illustrated) which is held in position in the spindle housing 13 between a shoulder on a reduced portion of the spindle and a screwed gland. Alternatively, as shown in FIGURE 1, the spindle 5 has a reduced diameter where it passes through the housing tube 13 to form a shoulder 17 near the enlarged bevel head end 6, reduced diameter portion of the spindle having a rotatable bearing in a separate sleeve 15 which is a press fit in or is secured in any other suitable manner to the housing 13. At the inner end of the bearing sleeve 15—which projects into the fluid passageway 2—a spacing and bearing ring 16 mounted on the spindle, takes abutment between the spindle shoulder 17 and the shoulder 18 formed by the projecting end of the bearing sleeve 15.

At intermediate positions between the inner and outer ends of the spindle 5, O-ring sealing grooves 19 are formed about the circumference of the spindle, while at the outer end of the spindle a collar 20—which is fixed by a set screw 21—has a flange 22 which takes abutment against the outer end of the bearing sleeve 15 so as to position the spindle axially in the sleeve with the required degree of tightness.

In operation of the valve device, rotation of the spindle 5 through 180° will move the valve disc from fully closed to fully open or vice versa. The rotation of the spindle may be continuous, carrying the disc through open-closed-open-closed and so on in a single sense of rotation, clockwise or anti-clockwise, or alternatively the spindle's rotation may be reversed after moving through 180° to bring about the same result.

FIGURES 5 to 8 show certain positions of the valve disc 3. In FIGURE 5 the disc is in the fully shut position at right angles to and thus blocking the fluid passageway 2 similar to the position depicted in FIGURE 1.

In FIGURE 6 the operating spindle 5 has been turned through 90 degrees in the direction of the arrow (FIGURE 5). In consequence the valve disc 3 has turned with the spindle 5 to take up a half open position at 45 degrees to the axis Z—Z of the passageway 2 (indicated in FIGURE 1), the 45 degree relative angular disposition of the spindle and valve causing the latter to make a compound movement against the face of the passageway 2 turning bodily with the periphery edge seal 4 rotating against and wiping axially along the face of the passageway 2, with an action not unlike that of a swash plate. In this half open position the valve has a compound inclination. Thus it lies across the passageway 2 and is twisted in relation to the original disc plane X—X as in the FIGURE 1 and 5 position so as to block partially the passageway 2.

In FIGURE 7 a further 90 degree turn has been applied to the spindle 5 in the direction of the arrow (FIGURE 5), which takes the valve to the full open position wherein it lies edge-on across and in the transverse plane containing the axis Z—Z of the passageway 2. During this movement, the periphery 4 of the valve has made both a rotatory and a sliding movement as in the preceding quarter turn and thus again there is a wiping action to effect self-cleaning of the valve. Continued rotation of the spindle for a further quarter turn puts the valve in half-open position again but with an opposite inclination to that of FIGURE 6, as will be seen in FIGURE 8. If rotation of the spindle 5 in the same direction is continued the valve will be brought back to the fully closed position as in FIGURE 5. However, the closing of the valve may be effected by reversing the direction of rotation, in which case the sequence of movement will be back from the FIGURE 7 position through the position of FIGURE 6.

It may be observed that if the disc or spindle angle is other than 45 degrees the amount of valve opening per angular movement may be varied. Thus, if say the angle is increased to 55 degrees, the 180 degree turn of the operating spindle to open the valve (as from the FIGURE 5 to FIGURE 7 positions just described) will leave the disc inclined at a different angle to the axis Z—Z through the valve passageway and not horizontally edge-on across the valve as with the 45 degree disc angle, and thus the passageway will not be opened to the same extent as with the 45 degree disc or spindle angle.

The valve body 1 may have flanges 23 for securing the body in a pipe line.

What is claimed is:

A valve device comprising a body having a cylindrical passageway for fluid, a valve disc within the passageway, said disc being coupled to an operating spindle mounted to rotate in the body with its axis set at an angle inclined to the disc face, whereby the periphery of the disc wipes along the wall of the passageway as the disc is rotated by the spindle, the inner end of the operating spindle being bevelled to correspond with the angle between the face of the disc and spindle axis, the disc abutting the bevel and being coupled to the spindle by a fixing screw formed with a bearing ring, said screw passing through a center hole in the disc having a diameter sufficient to permit rotation of the disc on said bearing ring the latter being longer than said center hole, said screw then passing into a tapping in the said bevelled end to secure the disc face against the bevel, said fixing screw providing a pivot about which the valve disc can rotate about its center axis.

References Cited in the file of this patent

UNITED STATES PATENTS

| 2,804,880 | Rasmusson | Sept. 3, 1957 |
| 2,934,312 | Stevens | Apr. 26, 1960 |

FOREIGN PATENTS

| 221,683 | Australia | Nov. 14, 1957 |
| 579,502 | Canada | July 14, 1959 |
| 520,873 | Italy | Mar. 24, 1955 |